(12) United States Patent
Umesh et al.

(10) Patent No.: US 9,025,539 B2
(45) Date of Patent: May 5, 2015

(54) MOBILE COMMUNICATION METHOD AND MOBILE STATION

(75) Inventors: Anil Umesh, Tokyo (JP); Mikio Iwamura, Tokyo (JP)

(73) Assignee: NTT DOCOMO, Inc., Tokyo (JP)

( * ) Notice: Subject to any disclaimer, the term of this patent is extended or adjusted under 35 U.S.C. 154(b) by 0 days.

(21) Appl. No.: 13/261,502

(22) PCT Filed: Apr. 28, 2011

(86) PCT No.: PCT/JP2011/060417
§ 371 (c)(1),
(2), (4) Date: Jan. 3, 2013

(87) PCT Pub. No.: WO2011/136351
PCT Pub. Date: Nov. 3, 2011

(65) Prior Publication Data
US 2013/0094450 A1    Apr. 18, 2013

(30) Foreign Application Priority Data
Apr. 30, 2010 (JP) .............. P2010-106012

(51) Int. Cl.
*H04W 4/00* (2009.01)
*H04W 52/24* (2009.01)
*H04W 52/36* (2009.01)
*H04L 5/00* (2006.01)
(Continued)

(52) U.S. Cl.
CPC .......... *H04W 52/242* (2013.01); *H04W 52/146* (2013.01); *H04W 52/325* (2013.01); *H04W 52/365* (2013.01); *H04W 52/367* (2013.01); *H04L 5/00* (2013.01)

(58) Field of Classification Search
CPC ...... H04W 4/00; H04W 52/365; H04W 52/34
USPC ......................................... 370/318
See application file for complete search history.

(56) References Cited

U.S. PATENT DOCUMENTS

| | | | |
|---|---|---|---|
| 8,249,091 B2* | 8/2012 | Kim et al. ............. | 370/432 |
| 8,351,359 B2* | 1/2013 | Heo et al. ............. | 370/310 |
| 8,792,425 B2* | 7/2014 | Power et al. .......... | 370/329 |

(Continued)

FOREIGN PATENT DOCUMENTS

| | | |
|---|---|---|
| EP | 2 582 189 A2 | 4/2013 |
| WO | 2010/135697 A2 | 11/2010 |

(Continued)

OTHER PUBLICATIONS

HTC, "Power Headroom Reporting," 3GPP TSG-RAN WG1 #60bis; R1-102309; Beijing, China; Apr. 12-16, 2010 (2 pages).

(Continued)

*Primary Examiner* — Hassan Kizou
*Assistant Examiner* — Deepa Belur
(74) *Attorney, Agent, or Firm* — Osha Liang LLP

(57) ABSTRACT

A mobile communication method according to the present invention includes a step of transmitting, by a radio base station eNB, "RRC Connection Reconfiguration" instructing to add new DL CC to a mobile station UE, a step of calculating, by the mobile station UE, Power headroom on the basis of a path loss estimated from the new DL CC, in response to the "RRC Connection Reconfiguration", and a step of transmitting, by the mobile station UE, "MAC Control Element" including the Power headroom to the radio base station eNB.

2 Claims, 3 Drawing Sheets

(51) Int. Cl.
*H04W 52/14* (2009.01)
*H04W 52/32* (2009.01)

(56) References Cited

U.S. PATENT DOCUMENTS

| | | | | |
|---|---|---|---|---|
| 2010/0158147 | A1* | 6/2010 | Zhang et al. | 375/260 |
| 2010/0238863 | A1* | 9/2010 | Guo et al. | 370/328 |
| 2012/0218904 | A1* | 8/2012 | Narasimha et al. | 370/248 |
| 2012/0294267 | A1* | 11/2012 | Wang et al. | 370/329 |
| 2013/0010720 | A1* | 1/2013 | Lohr et al. | 370/329 |
| 2013/0089050 | A1* | 4/2013 | Heo et al. | 370/329 |
| 2013/0121297 | A1* | 5/2013 | Kim et al. | 370/329 |

FOREIGN PATENT DOCUMENTS

| | | | |
|---|---|---|---|
| WO | 2011/049359 | A2 | 4/2011 |
| WO | WO 2011160275 | A1 * | 12/2011 |

OTHER PUBLICATIONS

3GPP TS 36.321 V9.2.0, "3rd Generation Partnership Project; Technical Specification Group Radio Access Network; Evolved Universal Terrestrial Radio Access (E-UTRA); Medium Access Control (MAC) protocol specification (Release 9)," Mar. 2010 (6 pages).

3GPP TS 36.213 V11.0.0, "3rd Generation Partnership Project; Technical Specification Group Radio Access Network; Evolved Universal Terrestrial Radio Access (E-UTRA); Physical layer procedures (Release 11)," Sep. 2012 (143 pages).

3GPP TS 36.133 V11.2.0, "3rd Generation Partnership Project; Technical Specification Group Radio Access Network; Evolved Universal Terrestrial Radio Access (E-UTRA); Requirements for support of radio resource management (Release 11)," Sep. 2012 (672 pages).

Extended European Search Report in counterpart European Application No. 117751321 issued on Oct. 23, 2013 (10 pages).

Research in Motion UK Limited; "Remaining Issues on Uplink Power Control for Carrier Aggregation"; 3GPP TSG RAN WG1 meeting #59bis, R1-100569; Valencia, Spain; Jan. 18-22, 2010 (4 pages).

Office Action issued in counterpart Australian application No. 2011246059 mailed Apr. 11, 2014 (3 pages).

Office Action issued in counterpart European Patent Application No. 11 775 132.1 dated May 20, 2014 (6 pages).

Office Action issued in counterpart Russian Patent Application No. 2012150158/07(080292) dated May 6, 2014 (7 pages).

Research in Motion UK Limited; "Remaining Issues on Uplink Power Control for Carrier Agregation"; 3GPP TSG RAN WG1 Meeting #59bis, R1-100569; Valencia, Spain; Jan. 18-22, 2010 (4 pages).

Office Action in counterpart Australian Patent Application No. 2011246059 issued on Oct. 3, 2014 (3 pages).

* cited by examiner

MOBILE COMMUNICATION METHOD AND MOBILE STATION

TECHNICAL FIELD

The present invention relates to a mobile communication method and a mobile station.

BACKGROUND ART

In an LTE (Long Term Evolution) scheme, a mobile station UE is configured to transmit, to a radio base station eNB, PHR (Power headroom report) including Power headroom through PUSCH (Physical Uplink Shared Channel, uplink shared channel) according to a predetermined transmission trigger.

Furthermore, the Power headroom indicates information on the difference between an estimated value of desired transmission power on the PUSCH for the mobile station UE and a maximum transmission power. In addition, the desired transmission power on the PUSCH is configured to be calculated on the basis of a path loss (Pathloss) estimated from a downlink.

In order to actually estimate the path loss from the downlink, the mobile station UE is configured to calculate the path loss by the difference between a transmission power (Resource Element unit) of a downlink common pilot signal (a cell-specific reference signal) in the radio base station eNB and a received power (Resource Element unit) of the downlink common pilot signal in the mobile station UE.

The radio base station eNB is configured to detect the amount of remaining transmission power available in the mobile station UE on the basis of the PHR, and to assign an uplink resource to the mobile station UE.

In an LTE-Advanced scheme which is a next generation of the LTE scheme, a mobile station UE is configured to be able to perform a CA (Carrier Aggregation) communication with a radio base station eNB by using a plurality of DL CCs (Downlink Component Carriers, downlink carriers) and a plurality of UL CCs (Uplink Component Carriers, uplink carriers), each of which has a different carrier frequency.

Furthermore, in the CA communication, in a case in which new DL CC was added or a case in which an inactive state of DL CC was changed to an active state, it is not possible for the radio base station eNB to detect available transmission power on the UL CC according to Power headroom until the Power headroom calculated on the basis of a path loss estimated from the DL CC is received, and thus there is a problem that it is not possible to perform appropriate scheduling on the UL CC.

Specifically, there may be a difference in path loss on the CCs, and thus it has been considered to notify it to the mobile station UE from the radio base station eNB, which DL CC is used for estimating the path loss, which is used by the mobile station UE in order to control transmission power on UL CCs used in a CA communication with the mobile station UE.

For example, on the basis of the configuration of CC in FIG. 1, when the radio base station eNB performs the CA communication with the mobile station UE, UL PCC and DL PCC are in the same path loss environment, and UL SCC#1, UL SCC#2, DL SCC#1, and DL SCC#2 (the UL PCC and the DL PCC are different from each other) are in the same path loss environment, the radio base station eNB notifies the mobile station UE of the fact that the path loss used in order to control transmission power on the UL PCC is to be estimated from the DL PCC, and the path loss used in order to control transmission power on the UL SCC#1 and the UL SCC#2 is to be estimated from the DL SCC#1 or the DL SCC#2. When there is a difference in path loss on the CCs, in order to allow the radio base station eNB to appropriately perform uplink resource assignment on each UL CC, it is necessary for the mobile station UE to transmit independent Power Headroom to the radio base station eNB, wherein the independent Power Headroom correspond to the number of DL CCs notified to be used to estimate the path loss from the radio base station eNB.

In the aforementioned example, it is necessary for the mobile station UE to transmit, to the radio base station eNB, Power Headroom obtained from desired transmission power of PUSCH on the UL PCC calculated on the basis of the path loss estimated from the DL PCC, and Power Headroom obtained from desired transmission power of PUSCH on the UL SCC#1 and the UL SCC#2 calculated on the basis of the path loss estimated from the DL SCC#1 or the DL SCC#2.

Then, the radio base station eNB performs uplink resource assignment on the UL PCC on the basis of the Power Headroom obtained from the desired transmission power of the PUSCH on the UL PCC calculated on the basis of the path loss estimated by the mobile station UE from the DL PCC, and performs uplink resource assignment on the UL SCC#1 and the UL SCC#2 on the basis of the Power Headroom obtained from the desired transmission power of the PUSCH on the UL SCC#1 and the UL SCC#2 calculated on the basis of the path loss estimated by the mobile station from the DL SCC#1 or the DL SCC#2.

However, in the CA communication, in the case in which new DL CC was added or the case in which the inactive state of DL CC was changed to the active state, it is not possible for the radio base station eNB to detect the available transmission power on the UL CC according to the Power headroom until the Power headroom calculated on the basis of a path loss on the DL CC is received, and thus there is a problem that it is not possible to perform appropriate scheduling on the UL CC.

Therefore, the present invention has been achieved in view of the above-described problems, and an object thereof is to provide a mobile communication method and a mobile station, in a CA communication, in a case in which new DL CC was added or a case in which an inactive state of DL CC was changed to an active state, by which it is possible to quickly perform appropriate scheduling on UL CC according to Power headroom calculated on the basis of a path loss estimated from the DL CC.

SUMMARY OF THE INVENTION

A first characteristic of the present embodiment is summarized in that a mobile communication method, in which a mobile station communicates with a radio base station by using a plurality of downlink carriers and a plurality of uplink carriers, each of which has a different carrier frequency, includes: a step of transmitting, by the radio base station, an instruction signal instructing to add a new downlink carrier to the mobile station; a step of calculating, by the mobile station, information on difference between an estimated value of desired transmission power on an uplink shared channel and a maximum transmission power of the mobile station, on the basis of a path loss estimated from the new downlink carrier, in response to the instruction signal; and a step of transmitting, by the mobile station, control information including the information on difference, to the radio base station.

A second characteristic of the present embodiment is summarized in that a mobile communication method, in which a mobile station communicates with a radio base station by using a plurality of downlink carriers and a plurality of uplink carriers, each of which has a different carrier frequency, includes: a step of transmitting, by the radio base station, an instruction signal instructing a change of a predetermined downlink carrier to an active state to the mobile station; a step of calculating, by the mobile station, information on difference between an estimated value of desired transmission power on an uplink shared channel and a maximum transmission power of the mobile station, on the basis of a path loss estimated from the predetermined downlink carrier, in response to the instruction signal; and a step of transmitting, by the mobile station, control information including the information on difference, to the radio base station.

A third characteristic of the present embodiment is summarized in that a mobile station configured to be capable of communicating with a radio base station by using a plurality of downlink carriers and a plurality of uplink carriers, each of which has a different carrier frequency, includes: a reception unit configured to receive an instruction signal instructing to add a new downlink carrier from the radio base station; a calculation unit configured to calculate information on difference between an estimated value of desired transmission power on an uplink shared channel and a maximum transmission power of the mobile station, on the basis of a path loss estimated from the new downlink carrier, in response to the instruction signal; and a transmission unit configured to transmit control information including the information on difference, to the radio base station.

A fourth characteristic of the present embodiment is summarized in that a mobile station configured to be capable of communicating with a radio base station by using a plurality of downlink carriers and a plurality of uplink carriers, each of which has a different carrier frequency, includes: a reception unit configured to receive an instruction signal instructing a change of a predetermined downlink carrier to an active state from the radio base station; a calculation unit configured to calculate information on difference between an estimated value of desired transmission power on an uplink shared channel and a maximum transmission power of the mobile station, on the basis of a path loss estimated from the predetermined downlink carrier, in response to the instruction signal; and a transmission unit configured to transmit control information including the information on difference, to the radio base station.

As described above, according to the present invention, it is possible to provide a mobile communication method and a mobile station, in a CA communication, in a case in which new DL CC was added or a case in which an inactive state of DL CC was changed to an active state, by which it is possible to quickly and appropriately perform scheduling on UL CC according to Power headroom calculated on the basis of a path loss on the DL CC.

DESCRIPTION OF EMBODIMENTS

Mobile Communication System According to First Embodiment of the Present Invention With reference to FIG. 1 to FIG. 5, the configuration of a mobile communication system according to a first embodiment of the present invention will be described.

The mobile communication system according to the present embodiment is an LTE-Advanced mobile communication system, and in the mobile communication system according to the present embodiment, a mobile station UE is configured to be able to perform a CA communication with a radio base station eNB by using a plurality of CCs having different carrier frequencies.

Figure 1:
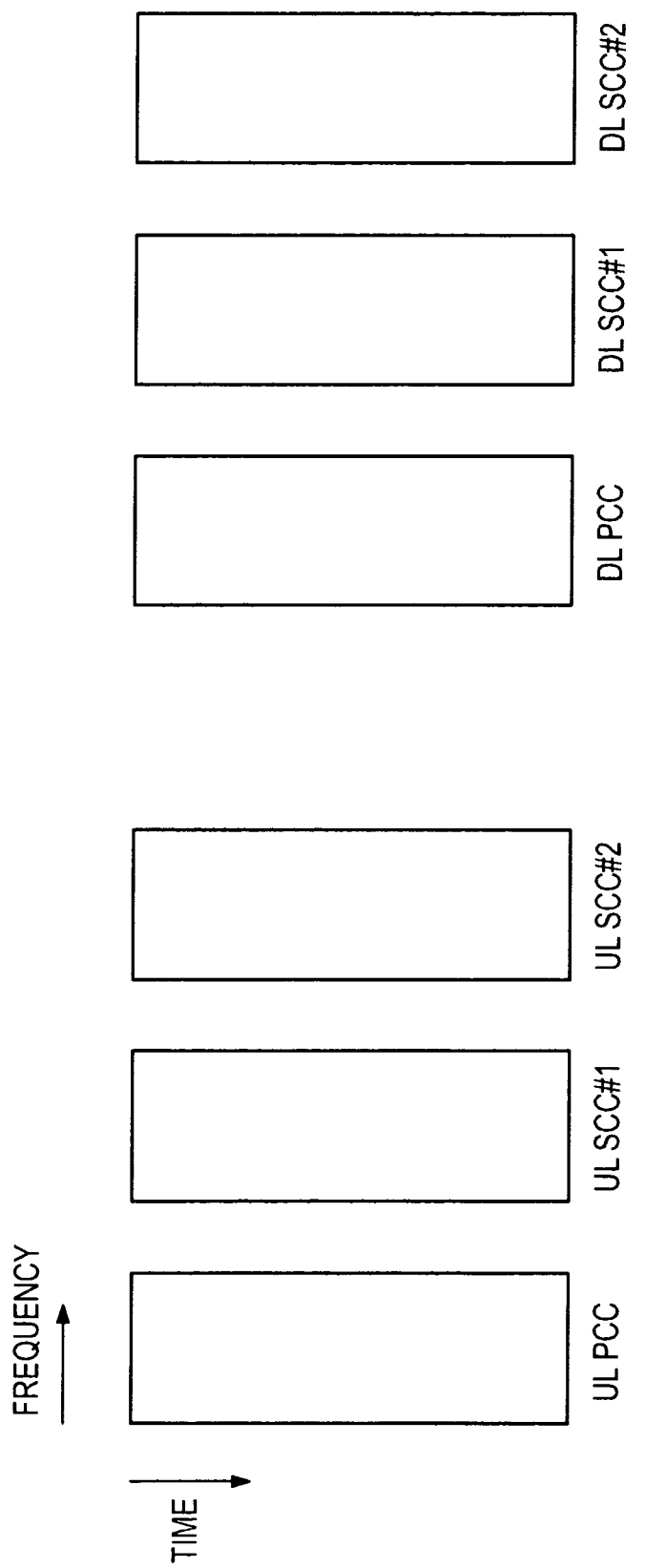
FIG. 1 is a diagram for explaining a CA communication performed in a mobile communication system according to a first embodiment of the present invention.

Furthermore, in the mobile communication system according to the present embodiment, as shown in FIG. 1, the mobile station UE is assumed to perform the CA communication by using UL PCC (Uplink Primary Component Carrier), UL SCC (Uplink Secondary Component Carrier) #1, UL SCC#2, DL PCC (Downlink Primary Component Carrier), DL SCC#1, and DL SCC#2.

Figure 2:
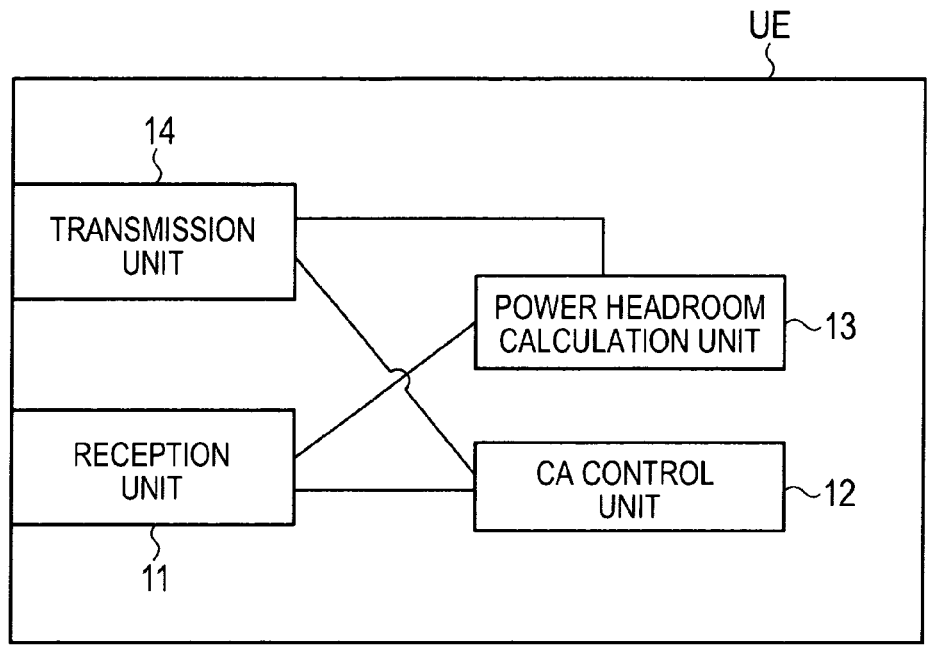
FIG. 2 is a functional block diagram of a mobile station according to the first embodiment of the present invention.

As shown in FIG. 2, the mobile station UE includes a transmission unit 14, a CA control unit 12, a Power headroom calculation unit 13, and a reception unit 11.

The reception unit 11 is configured to receive a signal transmitted by the radio base station eNB.

For example, the reception unit 11 is configured to receive an RRC message such as "RRC Connection Reconfiguration" instructing to add new DL CC from the radio base station.

Furthermore, the reception unit 11 is configured to receive a MAC signal such as "Active DL CC#X" instructing a change of predetermined DL CC to an active state from the radio base station.

The CA control unit 12 is configured to control the CA communication performed by the mobile station UE.

For example, when the mobile station UE performs the CA communication, the CA control unit 12 is configured to be able to newly add CC, delete existing CC, or change PCC on an RRC layer according to an instruction (specifically, an RRC message) from the radio base station eNB.

Furthermore, when the mobile station UE performs the CA communication, the CA control unit 12 is configured to set a state (an active state or an inactive state) of each CC, which is used in the CA communication, on a MAC layer according to an instruction (specifically, "MAC Control Element") from the radio base station eNB.

The Power headroom calculation unit 13 is configured to calculate Power headroom on the basis of a path loss estimated from predetermined DL CC.

For example, the Power headroom calculation unit 13 is configured to calculate the Power headroom on the basis of a path loss estimated from DL CC newly added by the CA control unit 12.

Furthermore, the Power headroom calculation unit 13 is configured to calculate the Power headroom on the basis of a path loss estimated from predetermined DL CC changed to an active state.

The transmission unit 14 is configured to transmit a signal to the radio base station eNB.

For example, the transmission unit 14 is configured to transmit "MAC Control Element (PHR)" including the aforementioned Power headroom to the radio base station eNB.

Figure 3:
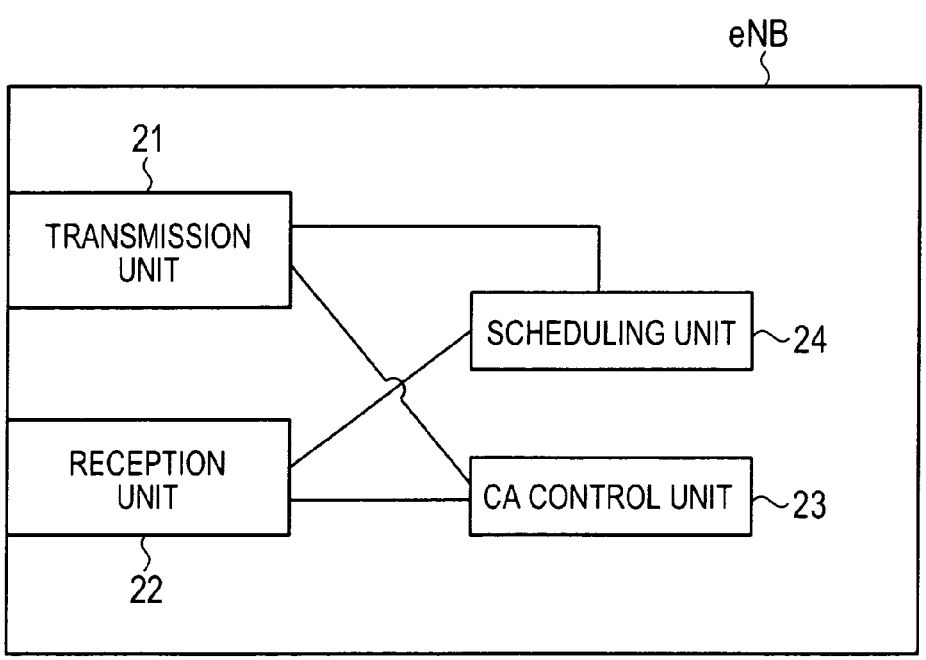
FIG. 3 is a functional block diagram of a radio base station according to the first embodiment of the present invention.

As shown in FIG. 3, the radio base station eNB includes a transmission unit 21, a reception unit 22, a CA control unit 23, and a scheduling unit 24.

The transmission unit 21 is configured to transmit a signal to the mobile station UE. For example, the transmission unit 21 is configured to transmit, to the mobile station UE, the RRC message such as "RRC Connection Reconfiguration" instructing to add new DL CC or the MAC signal such as "Active DL CC#X" instructing a change of predetermined DL CC to an active state.

The reception unit 22 is configured to receive the signal transmitted by the mobile station UE.

For example, the reception unit 22 is configured to receive the "MAC Control Element (PHR)" including the Power headroom from the mobile station UE. Furthermore, the reception unit 22 is configured to receive PHR of the number of DL CCs used in the CA communication performed by the mobile station UE.

Furthermore, the reception unit 22 may be configured to receive PHR corresponding to only the number of DL CCs used to estimate the path loss by the mobile station UE.

The CA control unit 23 is configured to control the CA communication performed by the mobile station UE.

For example, the CA control unit 23 is configured to be able to instruct the mobile station UE performing the CA communication to newly add CC, delete existing CC, or change PCC by using the RRC message (for example, an "RRC Reconfiguration" message) on the RRC layer.

Furthermore, after the mobile station UE was changed from an RRC_Idle state to an RRC_Connected state and started communication by using one DL CC and one UL CC similarly to in a case of the LTE (Release 8/9) scheme, the CA control unit 23 is configured to instruct to add the second and subsequent DL CC and UL CC by using the RRC message on the RRC layer.

Furthermore, for example, the CA control unit 23 is configured to instruct the setting of the state (an active state or an inactive state) of each CC, which is used in the CA communication, by using the "MAC Control Element" on the MAC layer.

The scheduling unit 24 is configured to perform a scheduling process for the mobile station UE on the basis of the PHR received by the reception unit 22.

For example, the scheduling unit 24 is configured to perform assignment of RB (Resource Block) on the PUSCH, assignment of TBS (Transport Block Size) on the PUSCH, determination of the presence or absence of the application of TTI bundling, or determination of the uplink/downlink transmission bandwidth of SRS (Sounding Reference Signal) on the basis of the PHR.

Hereinafter, an operation of the mobile communication system according to the present embodiment is explained with reference to FIG. 4 and FIG. 5.

Figure 4:
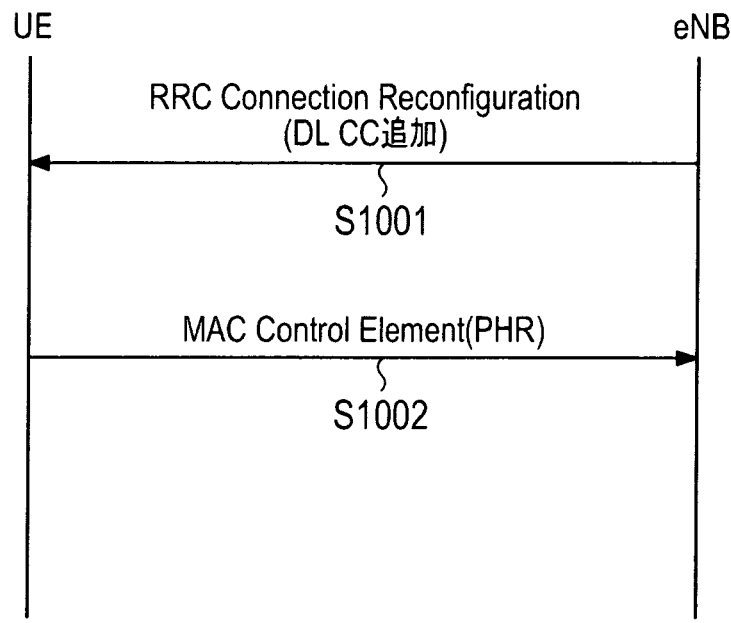
FIG. 4 is a sequence diagram illustrating an operation of the mobile communication system according to the first embodiment of the present invention.

Firstly, as shown in FIG. 4, in step S1001, the radio base station eNB transmits "RRC Connection Reconfiguration" instructing to add new DL CC to the mobile station UE performing a CA communication.

In step S1002, the mobile station UE calculates Power headroom on the basis of a path loss estimated from newly added DL CC in response to the "RRC Connection Reconfiguration", and transmits "MAC Control Element (PHR)" including the Power headroom to the radio base station eNB.

Figure 5:
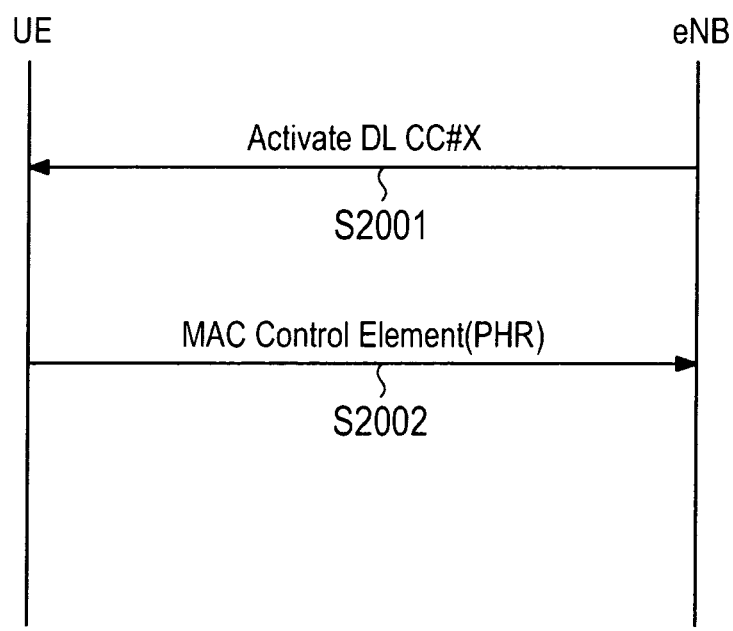
FIG. 5 is a sequence diagram illustrating an operation of the mobile communication system according to the first embodiment of the present invention.

Secondly, as shown in FIG. 5, in step S2001, the radio base station eNB transmits "Active DL CC#X" instructing a change of existing DL CC to an active state to the mobile station UE performing a CA communication.

In step S2002, the mobile station UE calculates Power headroom on the basis of a path loss estimated from DL CC changed to the active state in response to the "Active DL CC#X", and transmits "MAC Control Element (PHR)" including the Power headroom to the radio base station eNB.

In accordance with the mobile communication system according to the present embodiment, when the mobile station UE received the "RRC Connection Reconfiguration" instructing to add new DL CC, or the "Active DL CC#X" instructing a change of existing DL CC to an active state, the mobile station UE is configured to immediately transmit the Power headroom calculated on the basis of the path loss estimated from the DL CC to the radio base station eNB, so that it is possible for the radio base station eNB to quickly perform appropriate scheduling on UL CC according to the Power headroom.

The characteristics of the present embodiment as described above may be expressed as follows.

A first characteristic of the present embodiment is summarized in that a mobile communication method, in which a mobile station UE performs a CA communication with a radio base station eNB by using a plurality of DL CCs (downlink carriers) and a plurality of UL CCs (uplink carriers), each of which has a different carrier frequency, includes: a step of transmitting, by the radio base station eNB, "RRC Connection Reconfiguration (an instruction signal)" instructing to add new DL CC to the mobile station UE; a step of calculating, by the mobile station UE, information (Power headroom) on the difference between an estimated value of desired transmission power on PUSCH (an uplink shared channel) and a maximum transmission power of the mobile station UE on the basis of a path loss estimated from the new DL CC, in response to the "RRC Connection Reconfiguration"; and a step of transmitting, by the mobile station UE, "MAC Control Element (control information)" including the Power headroom to the radio base station eNB.

A second characteristic of the present embodiment is summarized in that a mobile communication method, in which a mobile station UE performs a CA communication with a radio base station eNB by using a plurality of DL CCs and a plurality of UL CCs, each of which has a different carrier frequency, includes: a step of transmitting, by the radio base station eNB, "Active DL CC#X (an instruction signal)" instructing a change of predetermined DL CC to an active state to the mobile station UE; a step of calculating, by the mobile station UE, Power headroom on the basis of a path loss estimated from the predetermined DL CC, in response to the "Active DL CC#X"; and a step of transmitting, by the mobile station UE, "MAC Control Element" including the Power headroom to the radio base station eNB.

A third characteristic of the present embodiment is summarized in that a mobile station UE, which is configured to be able to perform a CA communication with a radio base station eNB by using a plurality of DL CCs and a plurality of UL CCs, each of which has a different carrier frequency, includes: a reception unit 11 configured to receive "RRC Connection Reconfiguration" instructing to add new DL CC from the radio base station eNB; a Power headroom calculation unit 13 configured to calculate Power headroom on the basis of a path loss estimated from the new DL CC, in response to the "RRC Connection Reconfiguration"; and a transmission unit 14 configured to transmit "MAC Control Element" including the Power headroom to the radio base station eNB.

A fourth characteristic of the present embodiment is summarized in that a mobile station UE, which is configured to be able to perform a CA communication with a radio base station eNB by using a plurality of DL CCs and a plurality of UL CCs, each of which has a different carrier frequency, includes: a reception unit 11 configured to receive "Active DL CC#X" instructing a change of predetermined DL CC to an active state from the radio base station eNB; a Power headroom calculation unit 13 configured to calculate Power headroom on the basis of a path loss estimated from the predetermined DL CC, in response to the "Active DL CC#X"; and a transmission unit 14 configured to transmit "MAC Control Element" including the Power headroom to the radio base station eNB.

Note that the operation of the mobile station UE or the radio base station eNB may be performed by hardware, a software module executed by a processor, or a combination of the both.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such a storage medium and processor may be arranged in an ASIC. The ASIC may be arranged in the mobile station UE or the radio base station eNB. Furthermore, such a storage medium and processor may be arranged in the mobile station UE or the radio base station eNB as discrete components.

Thus, the present invention has been explained in detail by using the above-described embodiments; however, it is obvious that for persons skilled in the art, the present invention is not limited to the embodiments explained herein. The present invention can be implemented as a corrected and modified mode without departing the gist and the scope of the present invention defined by the claims. Therefore, the description of the specification is intended for explaining the example only and does not impose any limited meaning to the present invention.

INDUSTRIAL APPLICABILITY

As described above, according to the present invention, it is possible to provide a mobile communication method and a mobile station, in a CA communication, in a case in which new DL CC was added or a case in which an inactive state of DL CC was changed to an active state, by which it is possible to quickly and appropriately perform scheduling on UL CC according to Power headroom calculated on the basis of a path loss on the DL CC.

REFERENCE SIGNS LIST

UE . . . Mobile station
eNB . . . Radio base station
14, 21 . . . Transmission unit
11, 22 . . . Reception unit
12, 23 . . . CA control unit
13 . . . Power headroom calculation unit
24 . . . Scheduling unit

The invention claimed is:

1. A mobile communication method, in which a mobile station communicates with a radio base station by using a plurality of downlink carriers and a plurality of uplink carriers, each of which has a different carrier frequency, the method comprising:
a step of transmitting, by the radio base station, an instruction signal instructing a change of a predetermined downlink carrier to an active state to the mobile station;
a step of calculating, by the mobile station, a difference between an estimated value of desired transmission power on an uplink shared channel and a maximum transmission power of the mobile station, on the basis of a path loss estimated from just the active state predetermined downlink carrier, in response to the instruction signal; and
a step of transmitting, by the mobile station, control information including the difference, to the radio base station.

2. A mobile station configured to be capable of communicating with a radio base station by using a plurality of downlink carriers and a plurality of uplink carriers, each of which has a different carrier frequency, the mobile station comprising:
a reception unit configured to receive an instruction signal instructing a change of a predetermined downlink carrier to an active state from the radio base station;
a calculation unit configured to calculate a difference between an estimated value of desired transmission power on an uplink shared channel and a maximum transmission power of the mobile station, on the basis of a path loss estimated from just the active state predetermined downlink carrier, in response to the instruction signal; and
a transmission unit configured to transmit control information including the difference, to the radio base station.

* * * * *